United States Patent [19]

Hong

[11] Patent Number: 4,783,301
[45] Date of Patent: Nov. 8, 1988

[54] POLYBUTENE MOLDED ARTICLE AND METHOD FOR MAKING SAME

[75] Inventor: Kuo Z. Hong, Buffalo Grove, Ill.

[73] Assignee: The Dow Chemical Company, Midland, Mich.

[21] Appl. No.: 925,352

[22] Filed: Oct. 30, 1986

[51] Int. Cl.$^4$ .................... B29C 47/24; B29C 47/86
[52] U.S. Cl. .................... 264/209.2; 264/281;
264/372; 264/320; 264/328.16; 264/346;
425/378 R; 425/381; 425/378.1
[58] Field of Search .................... 264/209.2, 68, 171,
264/235, 310–312, 320, 346, 281, 328.16;
425/381, 382, 466, 378 R, 144

[56] References Cited

U.S. PATENT DOCUMENTS

| | | | |
|---|---|---|---|
| 2,372,177 | 3/1945 | Conner | 264/108 |
| 3,382,220 | 5/1968 | Bowman, Jr. | 264/209.7 |
| 3,468,862 | 9/1969 | Schotland | 264/28 |
| 3,551,194 | 12/1970 | Shepherd et al. | 264/320 |
| 3,714,320 | 1/1973 | Shaw | 264/323 |
| 3,907,952 | 9/1975 | Cleereman | 264/108 |
| 4,014,965 | 3/1977 | Stube et al. | 264/325 |
| 4,141,953 | 2/1979 | Kepes et al. | 264/209.2 |
| 4,324,756 | 4/1982 | Kepes et al. | 264/320 |
| 4,406,852 | 9/1983 | Riegel | 264/296 |
| 4,449,904 | 5/1984 | Austen et al. | 264/320 |

FOREIGN PATENT DOCUMENTS

| | | | |
|---|---|---|---|
| 58-199114 | 11/1983 | Japan | 264/235.6 |
| 59-19106 | 1/1984 | Japan | 264/312 |

Primary Examiner—Jeffery Thurlow
Attorney, Agent, or Firm—Price, Heneveld, Huizenga & Cooper

[57] ABSTRACT

The specification discloses a polybutene-1 polymer product and method and apparatus for making same in which the polymer is introduced into a form which defines the shape of the desired part and is then subjected to shear at a temperature from just above to just below the melting point of the polybutene-1 polymer, achieved by positioning the polymer blend between a shell and a mandrel and rotating the two relative to one another. When the viscosity of the polymer reaches a maximum, the part solidified and removed for subsequent use.

17 Claims, 17 Drawing Sheets

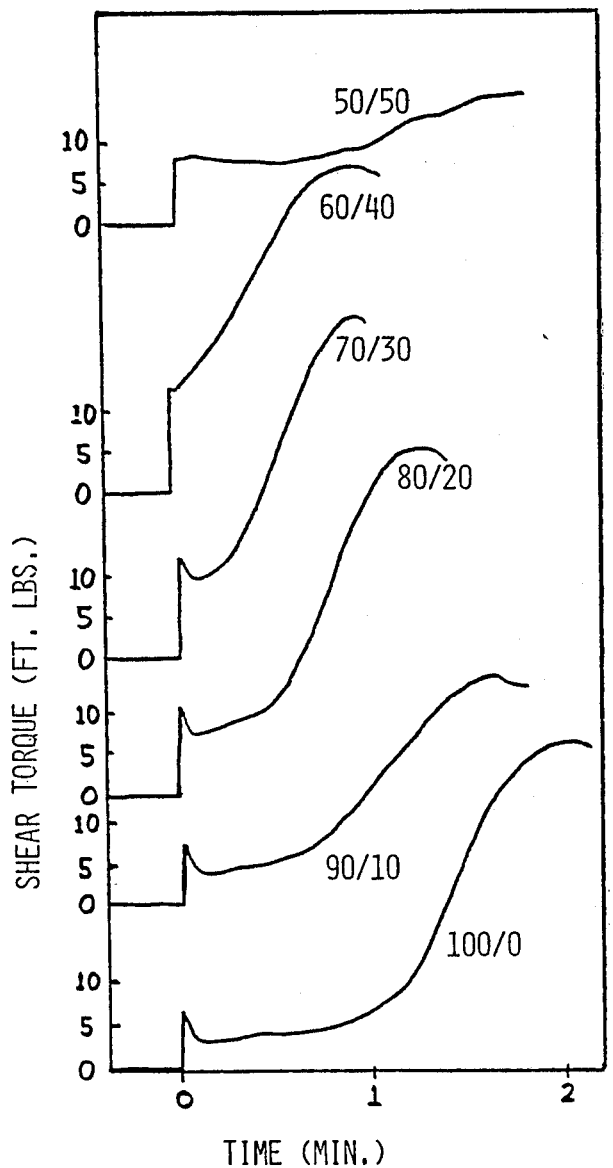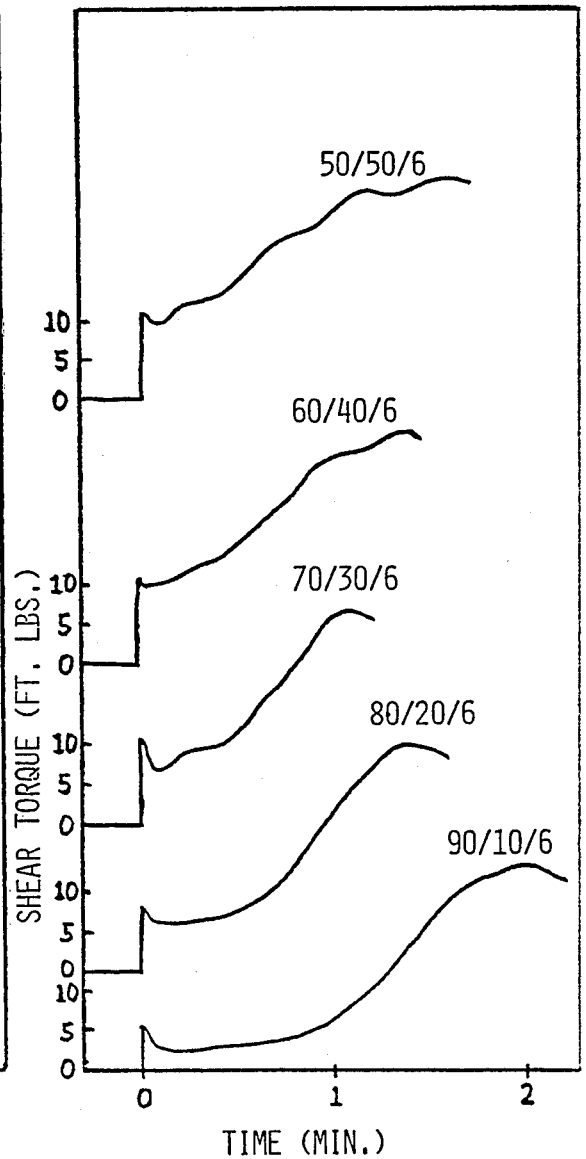
FIG. 15 A
FIG. 15 B

PB/PS BLEND NOT SHEARED

PB/PS BLEND SHEARED

POLYBUTENE MOLDED ARTICLE AND METHOD FOR MAKING SAME

CROSS REFERENCE TO RELATED APPLICATION

This application is related to Ser. No. 06/861,034, filed on May 7, 1986 and entitled FIBER REINFORCED POLYMER PRODUCTS AND METHODS AND APPARATUS RELATING TO SAME.

BACKGROUND OF THE INVENTION

The present invention relates to products made of polybutene-1. It is especially applicable to the production of extruded pipe using polybutene-1. Such pipe is made by melting the polybutene-1 and forcing it through an extruder die having approximately the dimensions desired for the pipe.

After extrusion, the polybutene-1 pipe must be allowed to cure for about a week. As the polybutene comes out of the extruder, it first begins forming one crystalline structure, which is then transformed over a period of about a week to a final crystalline structure.

In addition to the undesirable time required to allow such curing, the use of polybutene-1 in making pipe includes an additional drawback in that the dimensions of the pipe change as it undergoes its crystal transformation. Since one must wait a week to determine the final shape, die design is difficult. Manufacturing polybutene-1 pipe to critical dimensions is obviously a problem.

SUMMARY OF THE INVENTION

Surprisingly, the foregoing drawbacks to using polybutene-1 as a raw material for molding pipe and other products is eliminated by introducing the polybutene-1 into a form defining the desired shape and subjecting it to shear in said form at a temperature from just above to just below its melting point in order to induce crystallization. The product has achieved a substantial degree of its final crystal transformation without the necessity of allowing for substantial curing times. Indeed, the aforementioned secondary crystal transformation takes place in an extremely short time, not measurable by DSC technique.

Further, the foregoing method substantially improves the mechanical properties of polybutene-1 pipe, i.e. 1500 percent or more.

BRIEF DESCRIPTION OF THE DRAWINGS

FIG. 1 is a side elevational view of one embodiment of the apparatus which can be used in the method of the present invention;

FIG. 2 is a cross sectional view of the head portion of the apparatus taken generally along plane II—II of FIG. 1, with the relative position of the apparatus torque arm also being shown;

FIG. 3 is a cross sectional view of the head portion of the apparatus taken generally along plane III—III of FIG. 1;

FIG. 4 is a generally perspective view illustrating the loading of polymer blend semicylinders into the apparatus head;

FIG. 5 is a perspective view showing the insertion of the mandrel drive into the mandrel portion of the head;

FIG. 6 is a perspective view illustrating pinning the mandrel against rotation with respect to the mandrel drive;

FIG. 7 is a perspective view of the fully assembled head in which the head outer cylinder has been clamped to the stationary sleeve which fixes it against rotation;

FIGS. 8–18: Results

FIG. 8 shows the effect of shear induced crystallization on compressive load charted against hoop deformation for a 70% polybutene/30% polystyrene blend, both with and without 6% additional Kraton TM;

FIG. 9 illustrates the effect of shear induced crystallization on elongation of the blends of FIG. 8;

FIG. 13 shows stress versus strain for two polybutene-1 samples, one formed by shear crystallization in accordance with the present invention and one formed conventionally;

FIG. 14 shows the variation of pipe stiffness with shear rate for polybutene-1 and for 90% polybutene/10% polystyrene;

FIG. 15(A) (B) shows shear torque for various compositions (A) without Kraton TM and (B) with Kraton TM;

FIG. 16 shows shear stress versus time for 90% polybutene-1/10% polystyrene sheared at various shear rates;

FIG. 17 shows induction time as a function of initial shear stress;

FIG. 23 is a longitudinal cross sectional view of an alternative pipe extrusion apparatus which can be utilized in accordance with the present invention to manufacture pipe;

FIG. 24 is a longitudinal, partially cross sectional view of an alternative apparatus capable of producing thin sheet in accordance with the present invention; and FIG. 25 is a cross sectional view of an apparatus which can be used in accordance with the present invention to produce a cup-shaped object.

DESCRIPTION OF THE PREFERRED EMBODIMENT

In the preferred embodiment, the polybutene-1 is melted and introduced into the desired form. The melt is allowed to cool to approximately its melting point and is then subjected to shear. This is preferably accomplished by injecting the polybutene-1 melt into the space between a mandrel and exterior shell which are rotated relative to one another. Highly oriented polybutene-1 crystalline fibers are formed in situ in the resulting polybutene-1 product.

The term polybutene-1 as used herein is of course intended to encompass various blends based on polybutene-1. Such blends might include common additives, processing aids, and other polymers.

Of course, if other polymers such as polystyrene are blended with the polybutene-1 polymer, the melting range of the blend will be altered. In the case of such blends, reference to the melting point of polybutene-1, as for example in the claims, refers to the melting point of the polybutene-1 polymer component per se.

One additive polymer blended with polybutene-1 in the experimental work discussed herein was polystyrene. A 1500% enhancement of mechanical properties (as compared to polybutene-1 molded by conventional techniques) was experienced using polystyrene blended with polybutene-1 and polystyrene. The blend compositions ranged from 50 to 100% polybutene-1, with the optimum blend, with respect to results such as pipe stiffness and pipe tensile modulus is 90% polybutene-1 and 10% polystyrene. The pipe tensile modulus measured for this particular blend is more than 25 times that found for pure nonsheared polybutene-1.

After melting and, if necessary cooling to from just above to just below its melting point, the polybutene-1 is subjected to a generally uniform and, most preferably, generally constant shear at the desired crystallization temperature. It is uniform in that once established (i.e., ignoring start up), the shear rate at any given point remains generally the same until shearing is discontinued.

It is generally constant in that it is generally the same throughout the substantial body of the blend. Naturally, it is impossible to achieve an absolutely constant shear rate due to surface interface interactions. Hence the term "generally constant" is used to allow for variations imposed by practical limitations of commercial apparatus.

The requirement that the shear rate be generally uniform can be achieved by placing the polymeric blend between two flat plates and rotating them at a constant rate. However, such an apparatus would not yield a constant shear, in that the shear rate would be greater at the perimeter of the plates than at points located inwardly towards the center of rotation of the plates.

Figure 2:
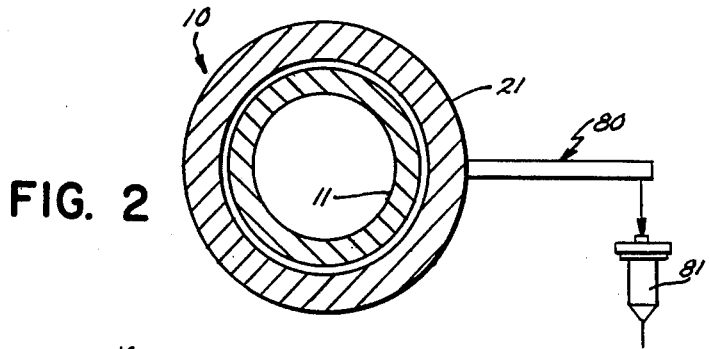
Figure 3:
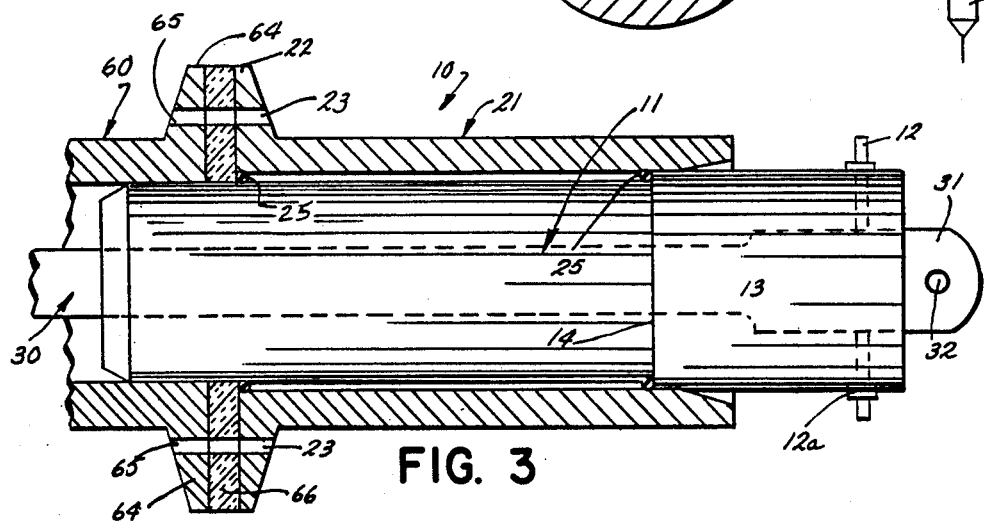

The most effective way found to insure a generally uniform shear is to introduce the polymer material into a mold or shearing head in a narrow space between a mandrel and an outer shell which rotate relative to one another. In the experimental apparatus described below, for example, the polymer material is introduced into a head 10 comprising a rotating mandrel 11 positioned within a stationary outer shell 21 (FIGS. 2 and 3). Because the polymer is rotating about a cylinder, it is always changing direction, but in a smooth, constant way rather than an abrupt way. Further, the shear rate is basically the same throughout the polymer, except possibly at the ends of the cylinder.

The desired crystallization temperature will fall within a range extending from just above to someplace just below the approximate melting point of the polybutene-1 polymer material. The selection of different crystallization temperatures within this range will alter somewhat the properties of the final product obtained. Further, the variation from nominal melting point will undoubtedly vary as a function of the additives and/or other polymer materials used in the polybutene-1 composition.

In some applications, it may be desirable to avoid viscous heating of the polymer material during shear. It has been found in general that when the shear rate is kept below about 11 sec.$^{-1}$, the maximum temperature rise due to viscous heating is only a small fraction of a degree centigrade. However when the shear rate exceeds about 11 sec.$^{-1}$, especially when a lower crystallization temperature is used, viscous heating may become a factor.

Below a shear rate of 11 sec.$^{-1}$, it was found that shear rate was not a particularly critical factor in determining the properties of the final product. Even so, when the shearing is conducted at lower rates (e.g., 1 or 2 sec.$^{-1}$), the in situ formed fibers tend to have less orientation. The optimum shear rate range is probably about 4 sec.$^{-1}$. Further, finer fibers tend to be obtained at lower temperatures (within reason, in that they obviously cannot be so low that the polymer solidifies) and higher shear rates.

Experiments discussed below suggest that the specific temperature at which the uniform shear is conducted has a more significant impact on the properties of the final product. This temperature will of course vary depending on the specific polybutene-1 blend. For a blend of polybutene-1 with 10% polystyrene, the range was 120° C. to 126° C. with 122° C. being optimum.

Shear rate is the velocity gradient across the two surfaces of the material being sheared, divided by the thickness of the sample:

$$\dot{\gamma} = \frac{V_1 - V_2}{\Delta R},$$

where $V_1$ is the velocity of the material at the inner surface, $V_2$ is the velocity of the material at the outer surface and $\Delta R$ is the thickness of the material.

In the case of a mandrel and shell arrangement where the inner mandrel is rotated and the outer shell is maintained stationary, $V_2$ will be essentially 0 and $V_1$ will be determined according to the following formula:

$$\dot{V}_1 = 2\pi \, R_i \, F/60,$$

where
 $R_i$ = the radius of the inner cylinder; and
 F = revolutions of the cylinder per minute.
Thus, shear rate would equal:

$$\dot{\gamma} = \frac{2\pi R_i \, F/60}{\Delta R}$$

Figure 1:
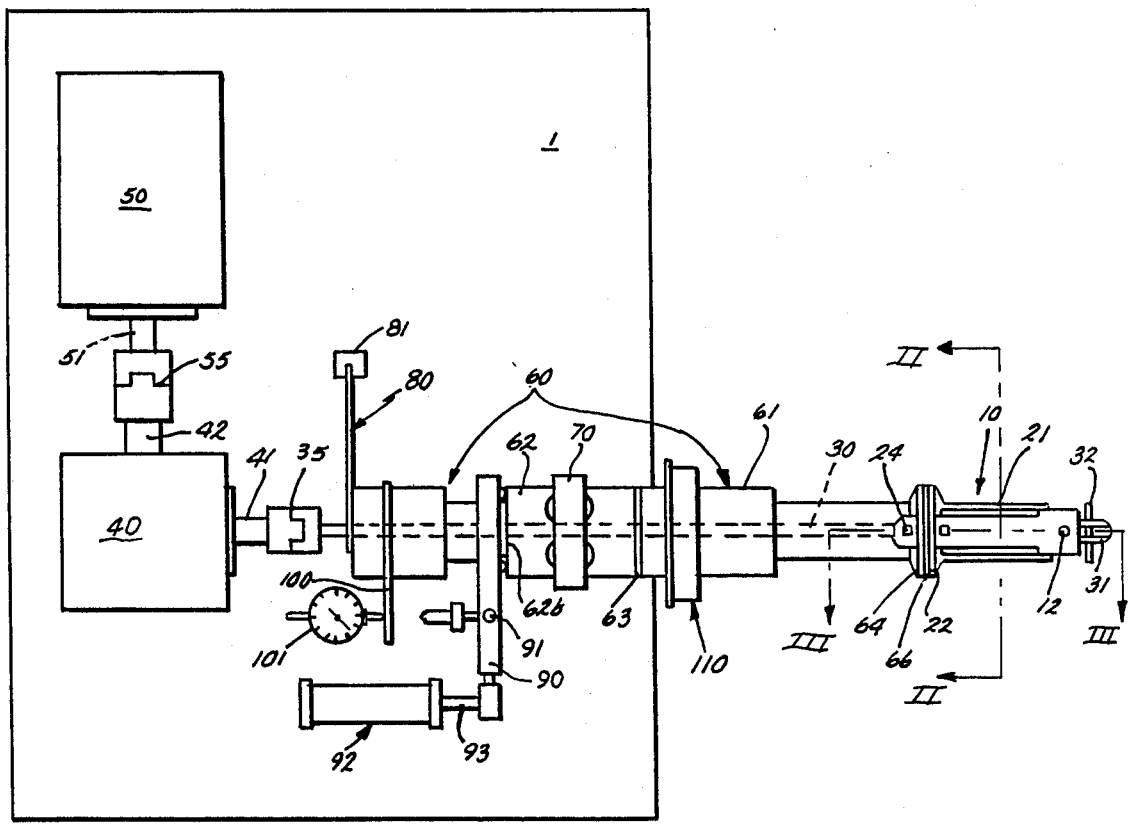
FIGS. 1–7: Apparatus

The experimental apparatus used to evaluate the present invention is illustrated in FIG. 1. The polybutene-1 is sheared in head 10, which comprises an inner mandrel or cylinder 11 and an outer shell 21 (FIGS. 1, 2 and 3). Inner mandrel 11 is itelf hollow so that it can be fitted over and coupled to mandrel drive shaft 30. Mandrel drive shaft 30 is driven by drive motor 50 through gear reducer 40. Outer shell 21 is restrained from rotation by securance to restraining sleeve 60 carried in a bearing block 70 and prevented from rotation by torque arm 80.

Figure 4:
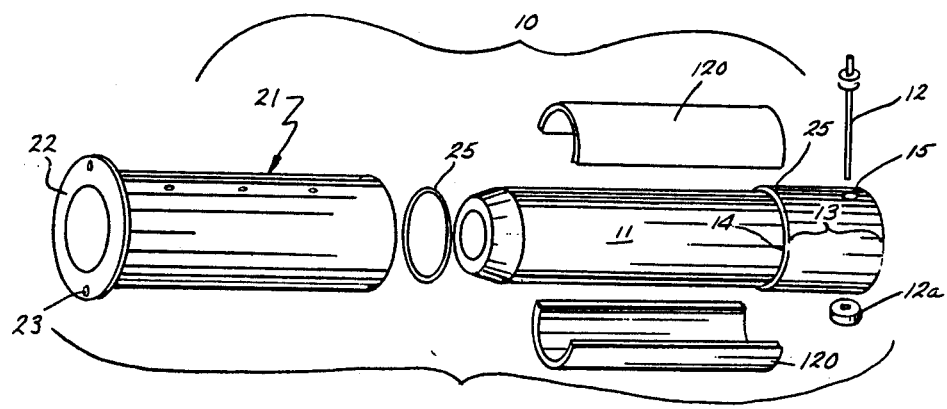

Rotating mandrel 11 is made of steel and is hollow. Its outer diameter over most of its length is 0.05 inches shorter than the inside diameter of outer shell 21, to thereby define a 0.05 inch space between mandrel 11 and outer shell 21. Mandrel 11 includes an enlarged front portion 13 which defines a shoulder 14 along its inner edge. The enlarged front 13 is approximately 0.05 inches larger in radius than the main body of mandrel 11 to thereby form a seal with the inner surface of outer shell 21 in the vicinity of shoulder 14. There are a pair of spaced O-ring seals 25 seated over the main body of mandrel 11 which create a sealed chamber in the space between O-rings 25 at each end and inner mandrel 11 and outer shell 21 (FIG. 3). Front section 13 includes apertures 15 through each sidewall for receiving coupling pin 12 which is used to couple mandrel 11 to mandrel drive shaft 30 (FIGS. 3 and 4). Coupling pin 12 includes a suitable fastener 12a to secure it in position as shown in FIG. 3.

Figure 5:
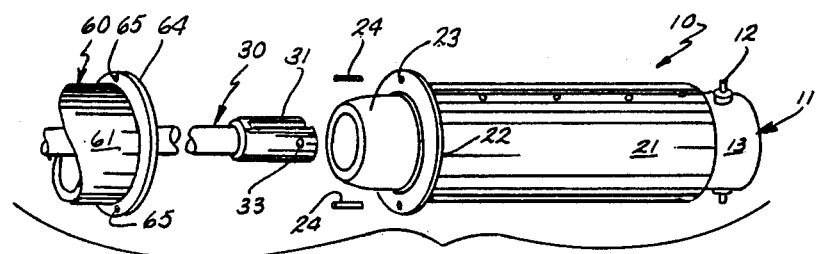
Figure 6:
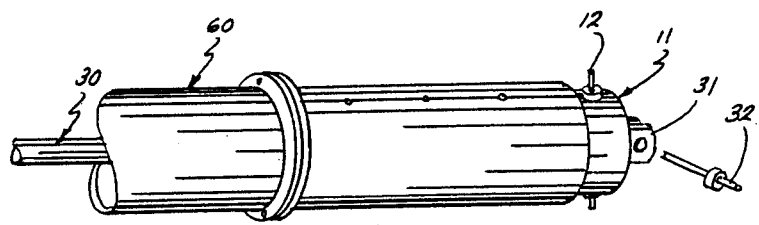

Outer shell 21 is also formed of steel and includes an annular flange 22 at its inner end (FIGS. 1, 3 and 4). There are a pair of oppositely spaced alignment holes 23 through flange 22 which receive alignment pins 24 whose purpose is to secure outer shell 21 against rotation with respect to restraining sleeve 60 (FIGS. 3 and 5).

Mandrel drive shaft 30 includes a yoke-shaped end 31 which slips over coupling pin 12 extending through the front end 13 of mandrel 11. There is an aperture 33 through each leg of yoke 31 through which a stop pin 32 can be fitted and secured by suitable fastening means (FIGS. 1, 3, 5 and 6). In operation, the entire assembly of sleeve 60, outer shell 21 and inner mandrel 11 are pushed to the right as viewed in FIG. 3 or FIG. 1 until mandrel 11 abuts stop pin 32.

Mandrel drive shaft 30 is coupled by drive coupling 35 to the output shaft 41 of gear reducer 40. Gear reducer 40 is in turn coupled at its input shaft 42 by coupling 55 to the output shaft 51 of drive motor 50. Drive motor 50 is of variable speed D.C. motor, capable of generating one horsepower at an input voltage of 230 volts. It will rotate at speeds up to approximately 1680 revolutions per minute. The gear reduction box 40 reduces the motor rotation through a reduction ratio of 40:1.

Restraining sleeve 60 is actually comprised of two sections, a front section 61 and a rear section 62 (FIG. 1). Both sections are formed of steel and are hollow to allow the passage of mandrel drive 30 therethrough. Sections 61 and 62 are secured together with an insulating disk 63 therebetween to minimize the conduction of heat from front section 61 to rear section 62. Both sections 61 and 62 of restraining sleeve 60 are carried on ball bearings which are interposed between its interior and mandrel drive 30.

Figure 7:
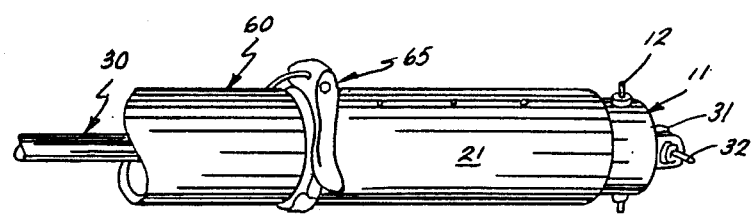

The right end of front section 61 terminates in an annular mounting flange 64 which includes alignment apertures 65 therethrough which mate with alignment apertures 23 on outer shell flange 22 and which receive alignment pins 24 (FIGS. 1, 3 and 5). An insulator ring 66 is interposed between annular flanges 22 and 64 to reduce heat transfer. Sleeve 60 and outer shell 21 are then clamped together by means of a band clamp 65 (FIG. 7).

Bearing block 70 is mounted on a supporting table 1 which preferably has casters so that the entire apparatus can be moved about the work area. Bearing block 70 includes bearings which allow both rotational and axial movement of restraining sleeve 60. Restraining sleeve 60 is restrained from rotation by a torque arm 80. The end of torque arm 80 engages a transducer 81 operably connected to a suitable readout for measuring the torque being generated in outer shell 21, as translated through restraining sleeve 60. In this way, the readout from transducer 81 provides a means, described below, for determining the extent to which crystallization has been induced in the polybutene-1 polymer being sheared between inner mandrel 11 and outer shell 21.

In order to allow for the expansion and contraction of polymer within the space between mandrel 11 and outer shell 21, outer shell 21 and restraining sleeve 60 are free to shift axially. In order to insure that polybutene-1 polymer is forced into contact with both the outer surface of mandrel 11 and the inner surface of shell 21, restraining sleeve 60 and outer shell 21 are biased to the right as viewed in FIGS. 1 and 3 by means of an air cylinder 92 acting upon pressure yoke 90. Pressure yoke 90 is basically a yoke-shaped member which slips over a reduced diameter section 62a of the inner section 62 of restraining sleeve 60 (FIG. 1). Yoke 90 then abuts a shoulder 62b formed where inner section 62 of sleeve 60 enlarges again.

Pressure yoke 90 is pivotally mounted on pivot 91 to table 1. It is secured at its end to the piston 93 of air cylinder 92 which urges the end of yoke 90 to the left as viewed in FIG. 1, which in turn forces sleeve 60 and outer shell 21 to the right as viewed in FIG. 1.

The biasing pressure applied is measured by a transducer 94 operably secured to pivot 91 and to a suitable readout means. In this manner, the force being applied can be determined.

Though not essential to the present invention, an axial translation arm 100 is secured to the inner section 62 of restraining sleeve 60. It projects therefrom and engages metering means 101 illustrated in FIG. 1. Metering means 101 preferably includes some type of chart readout so that the extent of axial translation of sleeve 60 and outer shell 21 can be determined throughout the course of the shearing operation.

Positioned in an annular fashion around the front portion 61 of restraining sleeve 60 is an insulated oven cover 110. This allows head 10 and the front section 61 of sleeve 60 to be inserted into an aperture in an oven with oven cover 110 sealing the opening to facilitate temperature control within the oven.

EXPERIMENTAL PROCEDURE

In the operation of the foregoing experimental apparatus, various blends of polybutene-1, including from 0 to 50% general purpose polystyrene and in some cases a compatibilizer rubber, Kraton ™ 2103 were blended and sheared at temperatures of 120° C., 122° C., 124° C. and 126° C. The specific blends tested were as follows:

| Polybutene-1/Polystyrene | Polybutene-1/Polystyrene/Kraton ™ |
| --- | --- |
| 50/50 | 50/50/6 |
| 60/40 | 60/40/6 |
| 70/30 | 70/30/6 |

| -continued | |
|---|---|
| Polybutene-1/Polystyrene | Polybutene-1/Polystyrene/Kraton ™ |
| 80/20 | 80/20/6 |
| 90/10 | 90/10/6 |
| 100/0 | |

The blend pellets were compression molded into two semicylindrical thin curved sheets 120 with dimensions of 3 inches by 4.5 inches by 0.045 inches so that they fit into the annular space between the inner mandrel 11 and outer shell 21 in head 10. The two half cylinders 120 are fitted over mandrel 11 between O-rings 25 as illustrated in FIG. 4. Outer shell 21 is slipped over mandrel 11 and the molded half cylinders 120 (FIGS. 4 and 5). Mandrel drive shaft 30 is inserted through the hollow interior of mandrel 11 and restraining sleeve 60 is pinned at flange 64 to the shoulder flange 22 of outer shell 21 by means of pins 24 (FIG. 5). Yoke 31 at the end of mandrel drive shaft 30 is slipped over coupling pin 12 which extends through apertures 15 in the end 13 of mandrel 11 (FIGS. 4 and 5). Stop pin 32 is then inserted through the apertures in the end of yoke 31 (FIG. 6) and a suitable clamp is used to hold shoulder flange 65 of restraining sleeve 60 tightly against shoulder flange 22 of outer shell 21 (FIG. 7).

Shear head 10 loaded with the polymer half shells 120 is then placed in a first oven. The oven preferably includes an aperture through which head 10 and the front portion 61 of restraining sleeve 60 are inserted until the insulated oven closure ring 110 comes into position against the opening.

The polymer is heated to about 30° to 50° C. above its melting temperature to insure that all previous crystallization memory has been completely destroyed. In the experimental work reported below, a 170° C. oven was used, and head 10 and its contents were heated to that temperature.

Head 10 is then removed from the first oven and inserted in a similar manner in a second oven which is maintained at the desired crystallization temperature. This crystallization temperature should be at about the melting point of the crystalline polymer component. The temperature was varied through such a range in the experimental work reported below.

Once the crystallization temperature has stabilized, shear is initiated. The shear apparatus used includes a control system (not shown) calibrated so that the desired shear rate can be selected. Given the dimensions of shear head 10, shear rate $\gamma$ can be calibrated as a function of revolutions of mandrel 11 per minute, which in turn can be related to the revolutions per minute of motor 50 by applying the gear reduction ratio of 40:1. In the apparatus used in the experimental work described below, the radius (Ri) of mandrel 11 is seven-tenths of an inch and the difference between the radius of mandrel 11 and the radius of the inside of outer shell 21 ($\Delta R$) is 0.05 inches. Inserting those into the shear rate formula, one establishes the following:

$$\gamma = \frac{2\pi Ri \cdot F/60}{\Delta R}$$

$$\gamma = \frac{2\pi (.7) \cdot F/60}{(.05)}$$

$$\gamma = 1.466 F,$$

where F = revolutions of the mandrel per minute.

Shearing is continued at the desired shear rate until a sharp rise in shear stress signals that substantial crystallization has been initiated. It is believed that the degree of crystallization which has occurred at this point is between about 10 and about 30%. It is, however, sufficient that nucleation for further rapid crystallization has been effected.

The shear stress, t (in psi), can be calculated from a torque measurement taken at transducer 81 at the end of torque arm 80. If "M" is the measured torque in foot pounds, "A" is the outer surface area of the sample 120, "L" is the length of the sample and "$R_o$" is the outer radius of the sample, then $$\begin{aligned} M \cdot 12 &= tAR_o \\ &= t(2\pi R_o L)R_o \\ &= 2\pi R_o^2 L t \end{aligned}$$

$$t = \frac{M \times 12}{2\pi R_o L} = \frac{12}{2\pi R_o L}$$

Using $R_o = 0.75''$, $L = 3.0''$:

$$t(psi) = 1.132M \quad M \text{ in ft-lb}$$

In the experimental polymer samples 120, "$R_o$" equals 0.75 inches and "L" equals 3.0 inches. Therefore, $$t \text{ (psi)} = 1.132M \text{ (foot pounds)}.$$

The melt was sheared isothermally at a constant shear rate. When the shear stress reached a maximum value, the rotation of the inner cylinder was stopped and the shear head was disconnected and quenched in ice water immediately. The temperature and shear stress were recorded during shearing. The resulting tubular samples were then tested.

EXPERIMENTAL MEASUREMENTS

A. MECHANICAL PROPERTIES

1. Pipe Stiffness (ANSI/ASTM 2412-77)

Each composite tube (3" long, 1.5" diam.) was cut into 0.5" wide ring-shaped specimens for the tests. Instron in compression mode was used to determine the pipe stiffness. The load, F', was recorded as a function of deflection, $D' - D_o$, where $D_o$ is the original undeformed outside diameter.

The pipe stiffness can be calculated following the formula:

$$\text{Pipe Stiffness} = \frac{F}{(D' - D_o) \cdot L}$$

where L is length of the pipe. In the present case $D_o = 1.5''$ and $L = 0.5''$. The initial pipe stiffness can be further simplified as follows:

$$\text{Pipe Stiffness} = S/L$$

where S is the initial slope obtained directly from the load-deflection curve. For each sample, at least three measurements were made to obtain value as the pipe stiffness. The pipe stiffness is expressed as psi.

Figure 8:
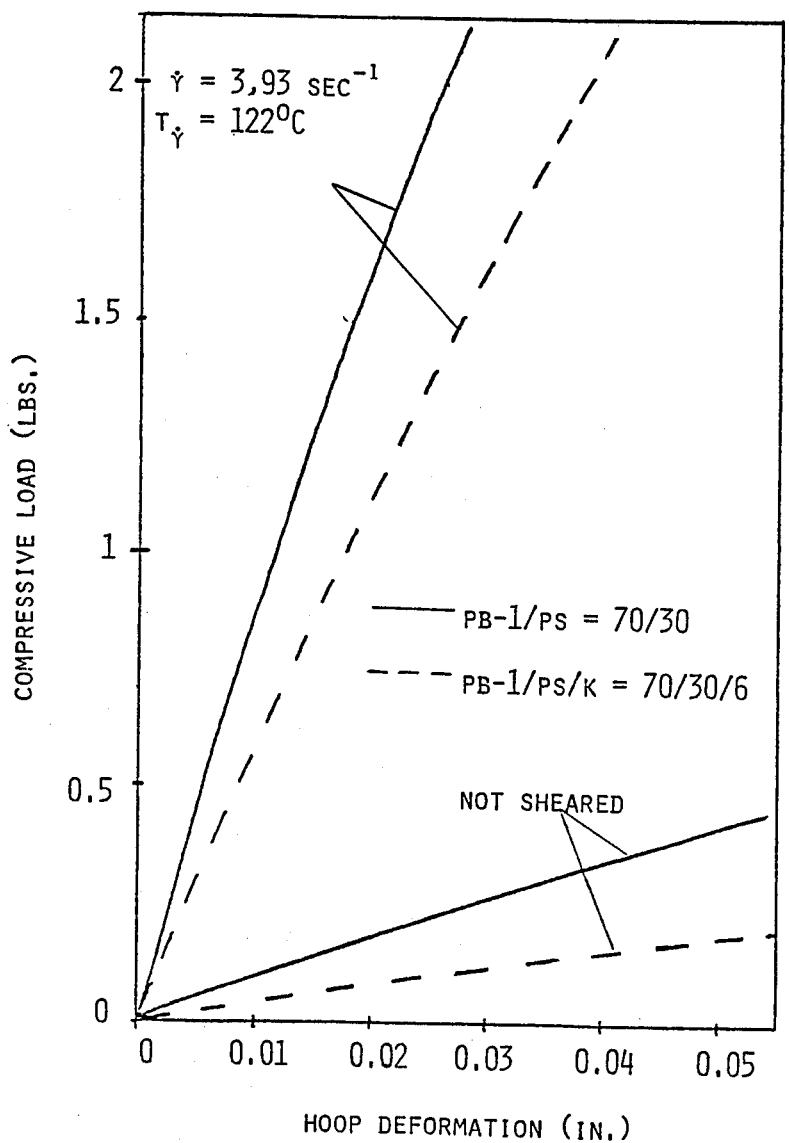
Figure 10B:
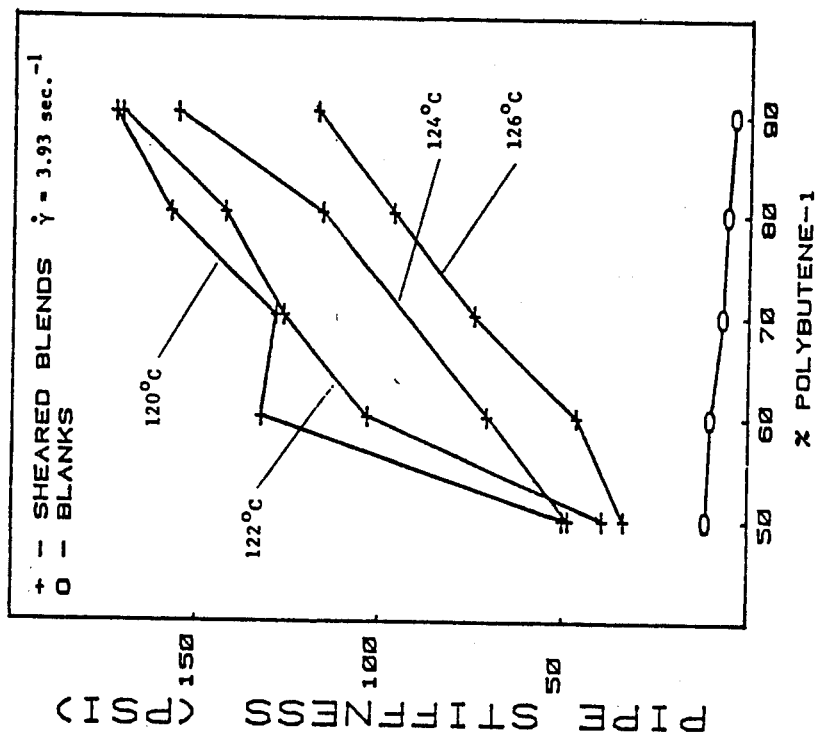
FIGS. 10A and 10B show pipe stiffness data for polybutene and various polybutene/polystyrene samples (10A) without Kraton TM and (10B): with Kraton TM.
Figure 10A:
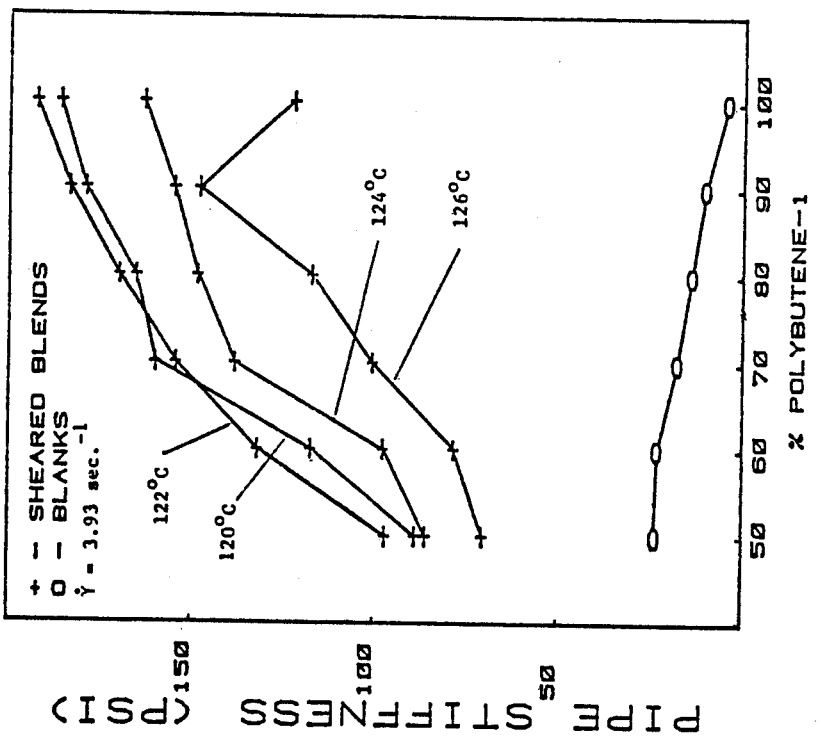

Typical load-deflection curves from compression tests are shown in FIGS. 8 and 10. Dramatic increase in stiffness due to shear induced crystallization (SIC) is clearly shown. The pipe stiffness values calculated from the initial slope of the curves are shown in FIGS. 10A and 10B for the samples prepared under various shearing conditions. The data indicate that the pipe stiffness of the tubes made of the same blend can be increased up to 1500% by a minimal amount of shear during fabrication.

2. Hoop Modulus and Tensile Strength

Figure 9:
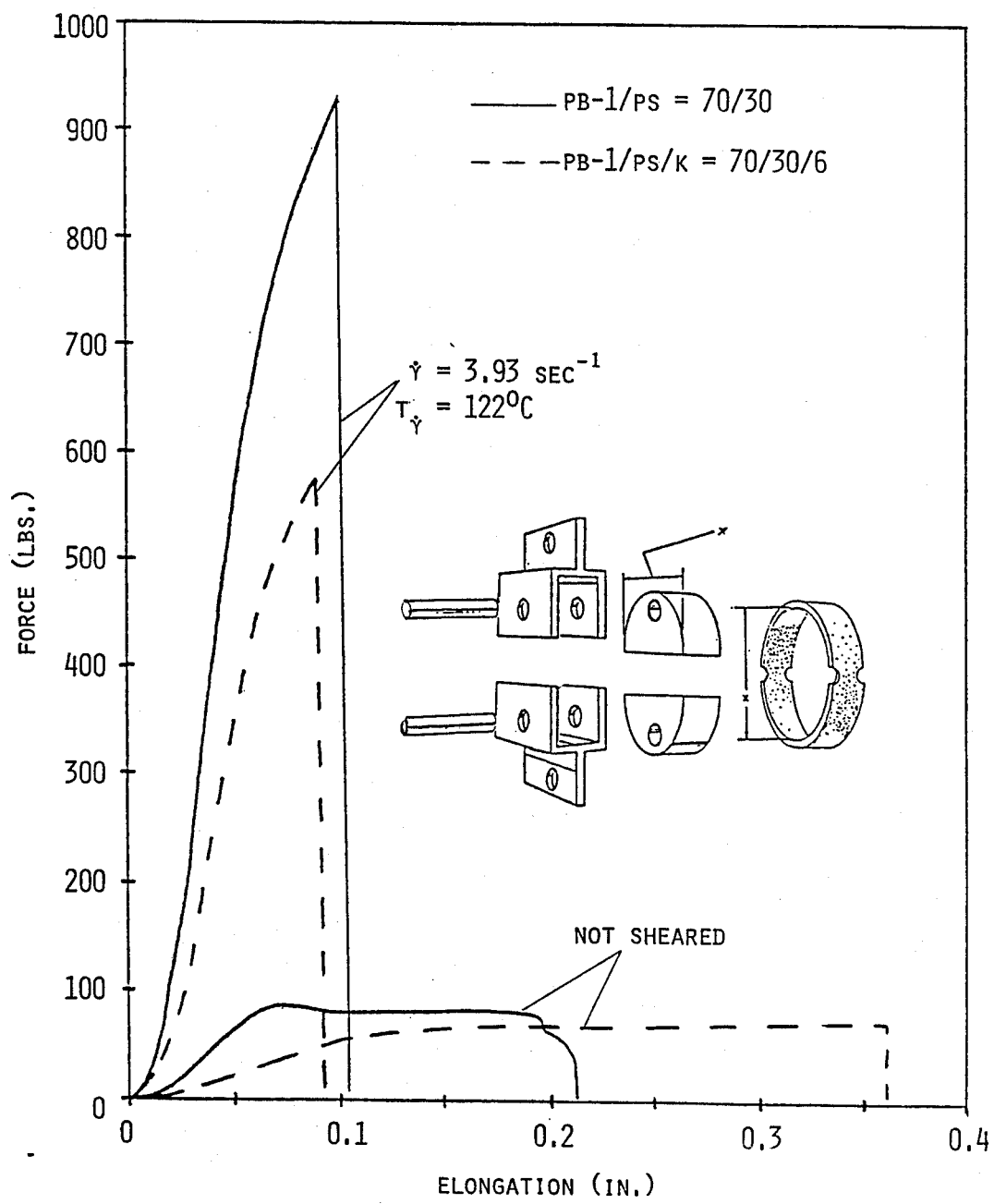

Split-disk method (ANSI/ASTM D2290.76) was used to determine the hoop modulus and hoop tensile strength of the tubular composites. The split-disk fixture was made to fit the geometry of polymer tubes 120 (FIG. 9). The same specimens used for pipe stiffness tests were used for this measurement, assuming that the small deflection (0.1–0.2″) during the compression test would not affect the hoop tensile test. Each ring was punched on the edges to make a reduced section, as shown in FIG. 9. The sample was loaded through the self-aligning disk which applied tensile stress to the sample in the hoop direction. The test fixture was designed to minimize the effect of the bending moment during stretching. The stretching force, F″, was recorded as a function of elongation, $D_b - D_o$. The calculations are shown below:

$$\text{Hoop modulus, } E = \frac{S D_o}{2A} \text{ (in psi)} \quad (a)$$

$$\text{Tensile strength at break, } \tau b = \frac{F''_b}{2A} \text{ (in psi)} \quad (b)$$

$$\text{\% Elongation at break, } b = \frac{D_b - D_o}{D_o} \times 100\% \quad (c)$$

where S is the initial slope, A is the area of the notched cross section.

Three measurements were made for each tubular sample to obtain an average value.

B THERMAL PROPERTIES

Melting behavior was measured using DSC scanning at 10 C./min. From the scans, melting temperature, temperature at which melting ended, and the heat of fusion ($\Delta H$) were recorded.

C. CRYSTALLINITY

The crystallinity values calculated from heat of fusion data (Column 5, Table I) are listed in Column 6 of Table I, infra.

D. CRYSTAL ORIENTATION

A Statton camera was used to take the wide angle X-ray diffraction patterns of the samples with X-ray beam perpendicular to the shear flow direction. All films were exposed for 4 hours. The degree of crystal orientation is indicated by the degree of arcing of the diffraction rings.

EXPERIMENTAL RESULTS

Figure 11B:
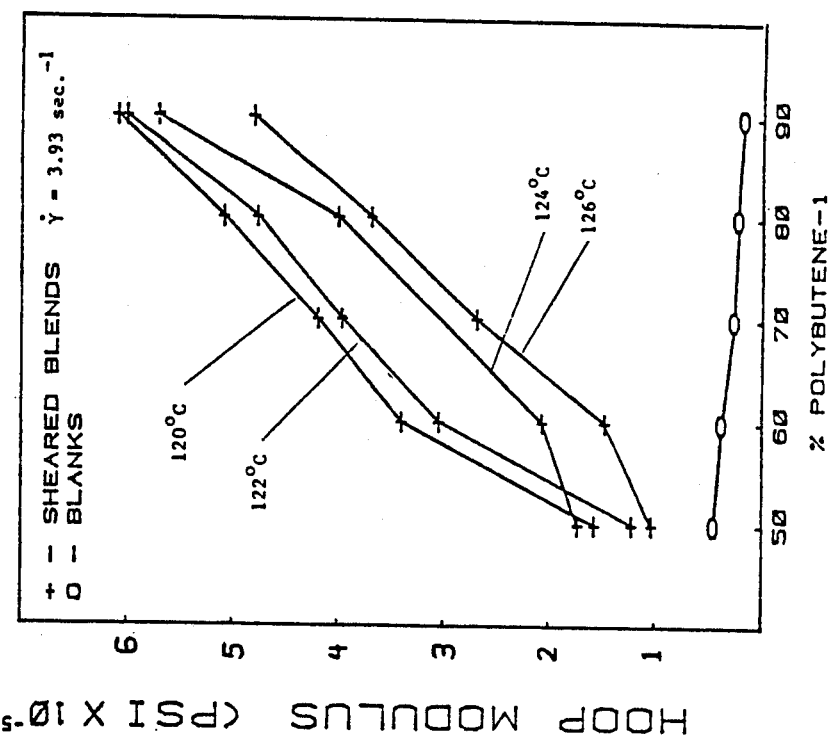
FIGS. 11A and 11B shows hoop modulus data for polybutene and various polybutene/polystyrene blend samples (11A) without Kraton TM and (11B) with Kraton TM.
Figure 11A:
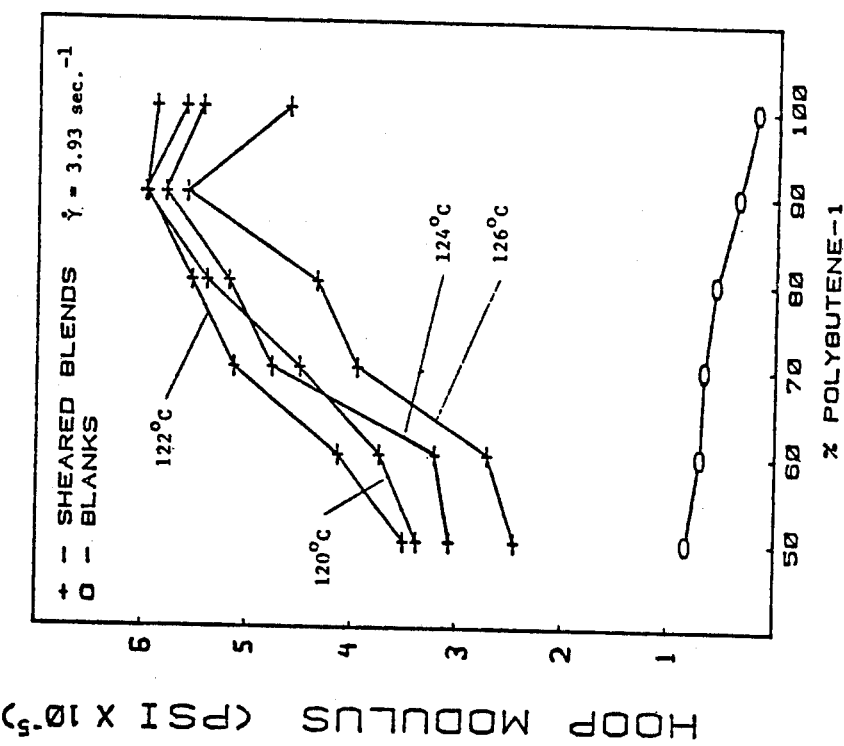
Figure 12B:
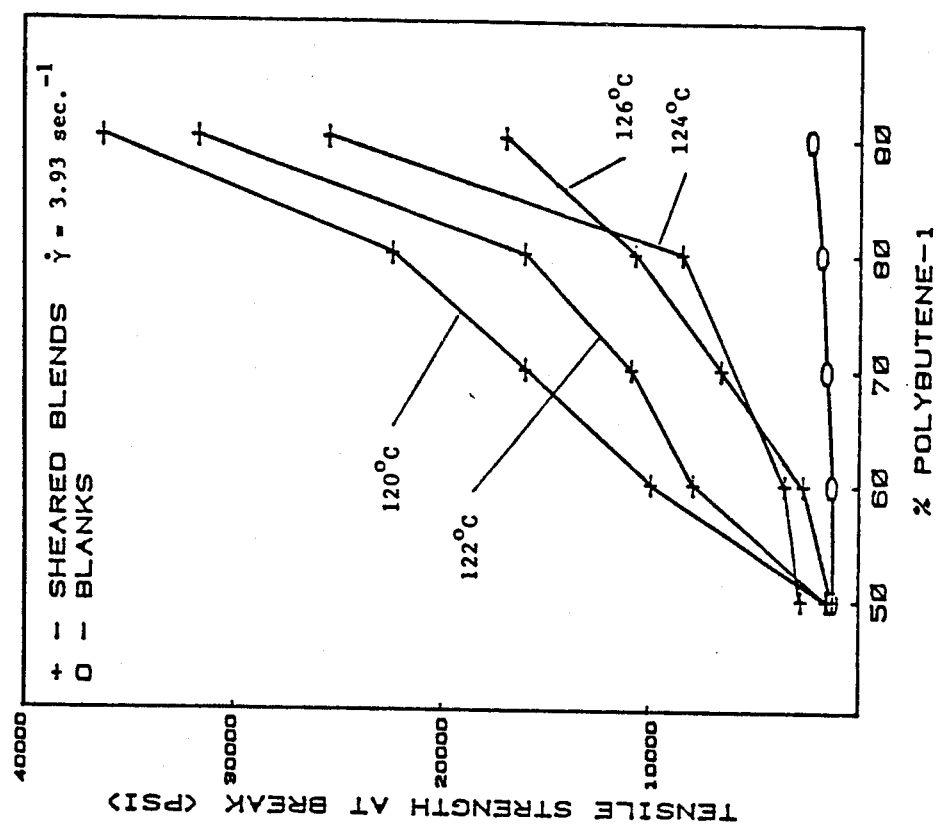
FIGS. 12A and 12B shows tensile strength at break for samples (12A) without Kraton TM and (12B) with Kraton TM.
Figure 12A:
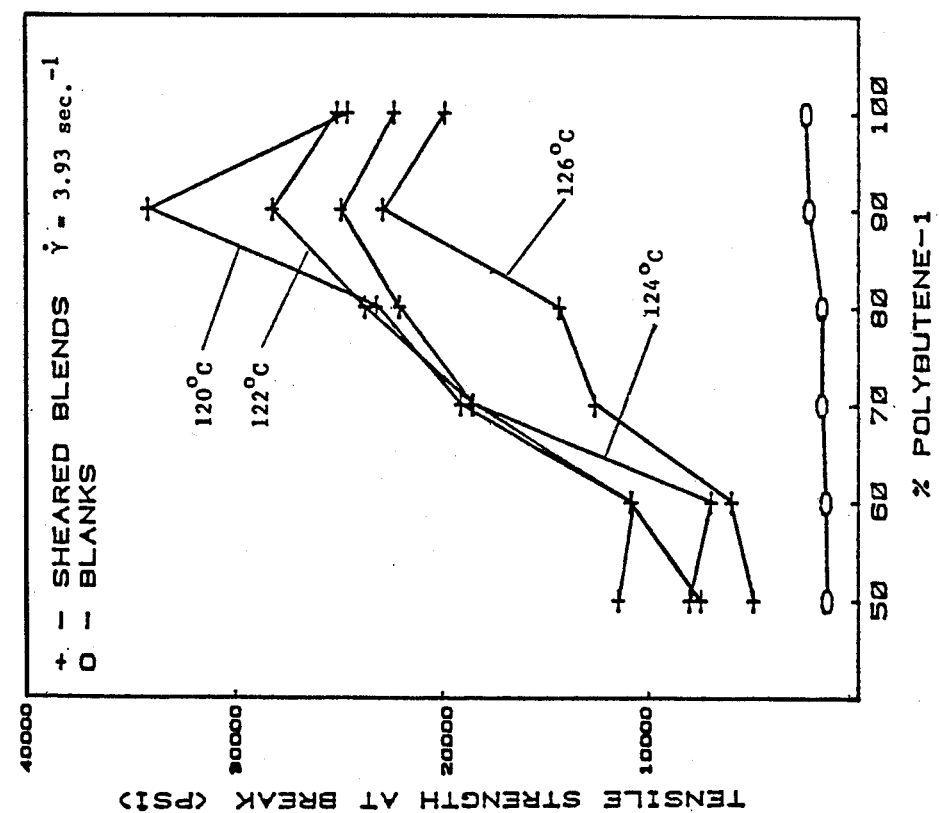

FIGS. 8 and 9 illustrate the dramatic difference observed in the mechanical properties of SIC and non-SIC polybutene-1 materials. FIGS. 10, 11 and 12 show the results of the mechanical tests. The value of SIC is quite apparent from these data. The pipe stiffness, pipe tensile modulus and tensile strength at break are all improved dramatically by SIC. In the case of the 90/10 polybutene-1/polystyrene blend sheared at 122° C. and 3.93 sec.$^{-1}$, the improvements in pipe tensile modulus and pipe stiffness are 1500%, and in tensile strength at break, 1100%. Of the compositions studied, the best properties are obtained using a 90/10 blend, surpassing even sheared polybutene-1 itself.

Figure 13:
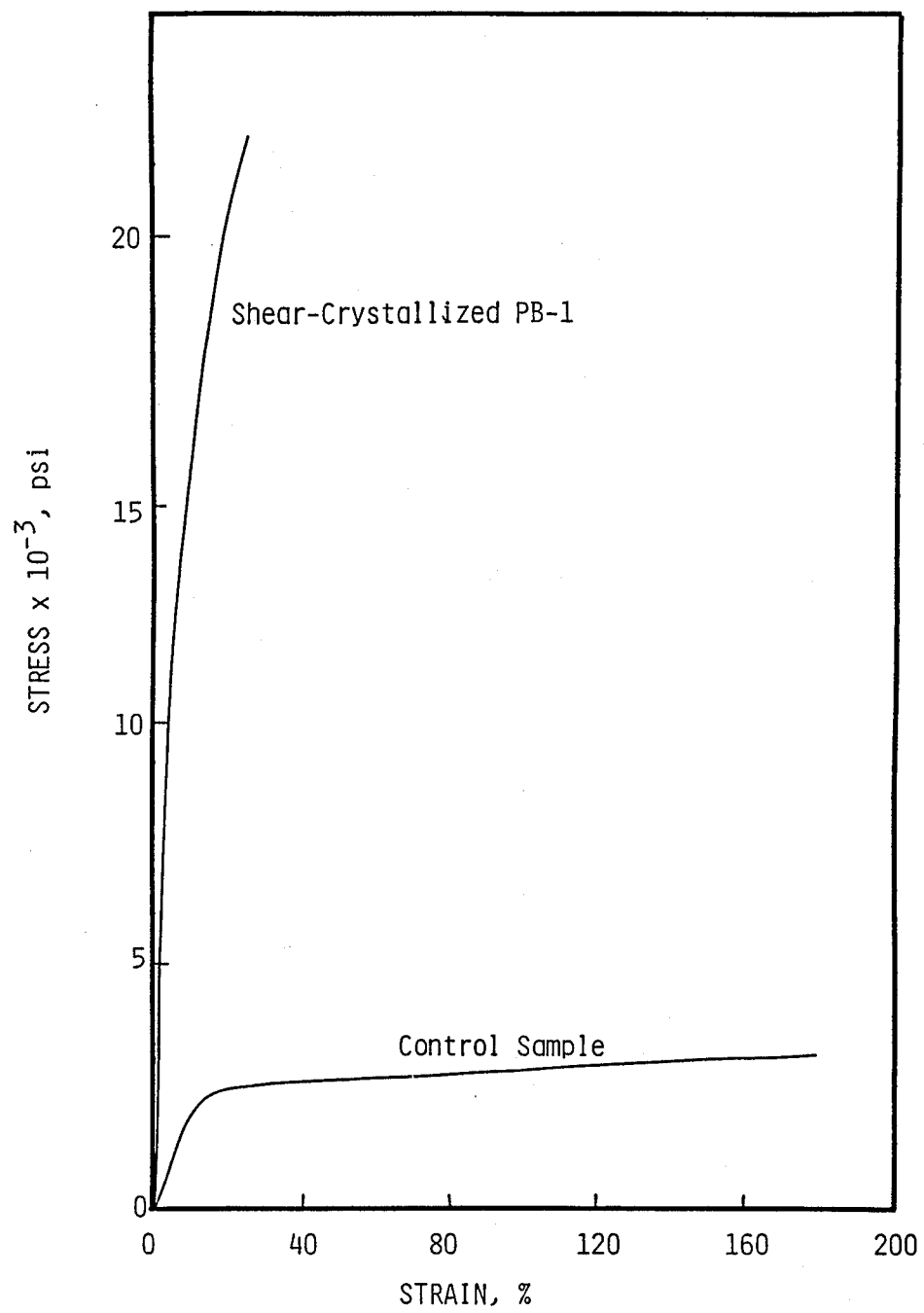

FIG. 13 charts stress versus strain in the hoop direction for pure polybutene-1 formed conventionally and by the shear crystallization technique of the present invention. The increase in strength for shear crystallized polybutene-1 is dramatic.

Across the composition range, the optimum shearing temperature appears to be 122° C. for blends without Kraton and 120° C. for blends with Kraton TM provided the shear rate is 3.93 sec.$^{-1}$. It is apparent that samples containing Kraton do not perform as well in the mechanical tests as do the corresponding samples without Kraton TM. It was noted in several samples having higher polystyrene concentrations that when Kraton TM was included in the blend, considerable flaking and delamination occurred upon removal of the sample from the shear head. Such samples were distinctively mottled in appearance. This was not observed in samples that did not contain Kraton TM except in the 50/50 blend. Based on this evidence, it appears there is more of a compatibility problem with Kraton TM than without it.

Figure 14:
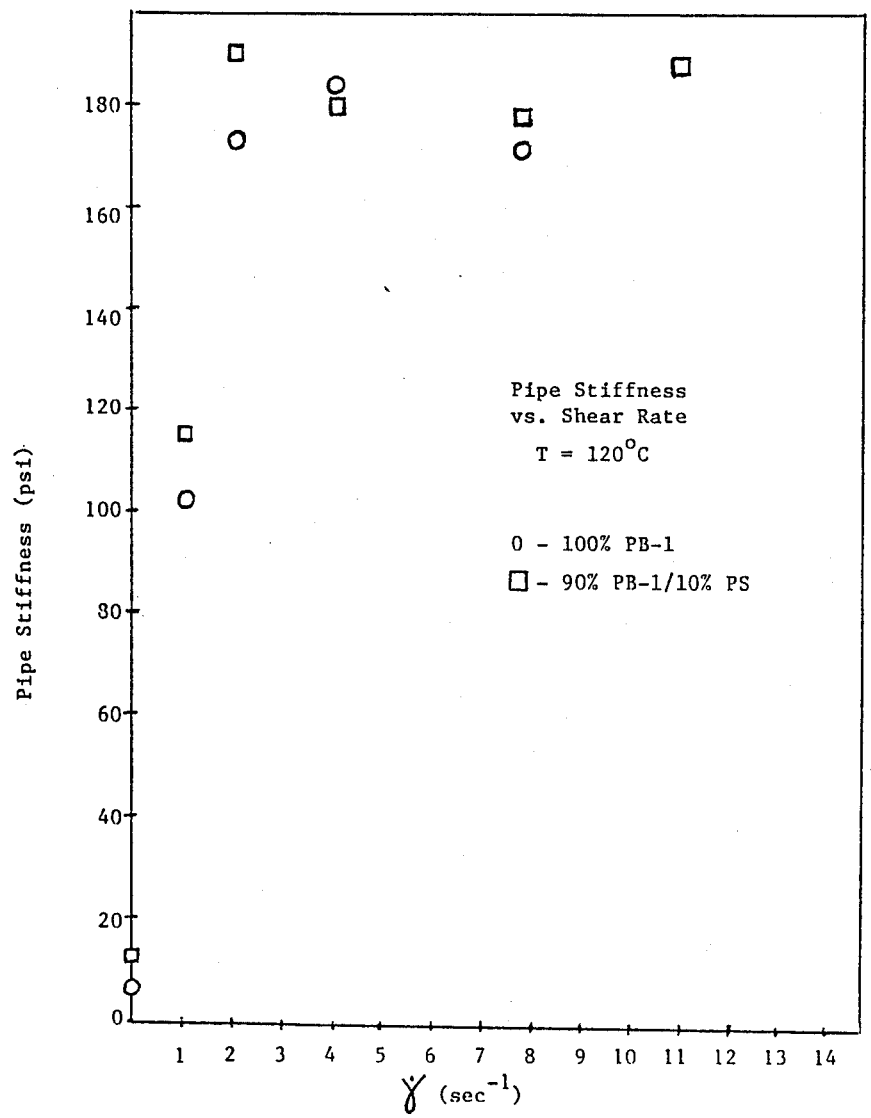

Samples of the 90/10 blend and of 100% polybutene-1, when sheared at a rate of 1.0 sec.$^{-1}$ (T=120° C.), show some improvement in mechanical properties (see FIG. 14). More improvement is seen when these materials are sheared at 2.0 sec.$^{-1}$. Shearing beyond a rate of 2.0 sec.$^{-1}$ at 120° C. does not result in any further enhancement of mechanical properties. However, when considering a scaled-up version of this process, one cannot ignore the effect of shear rate on induction time as discussed below.

Figure 16:
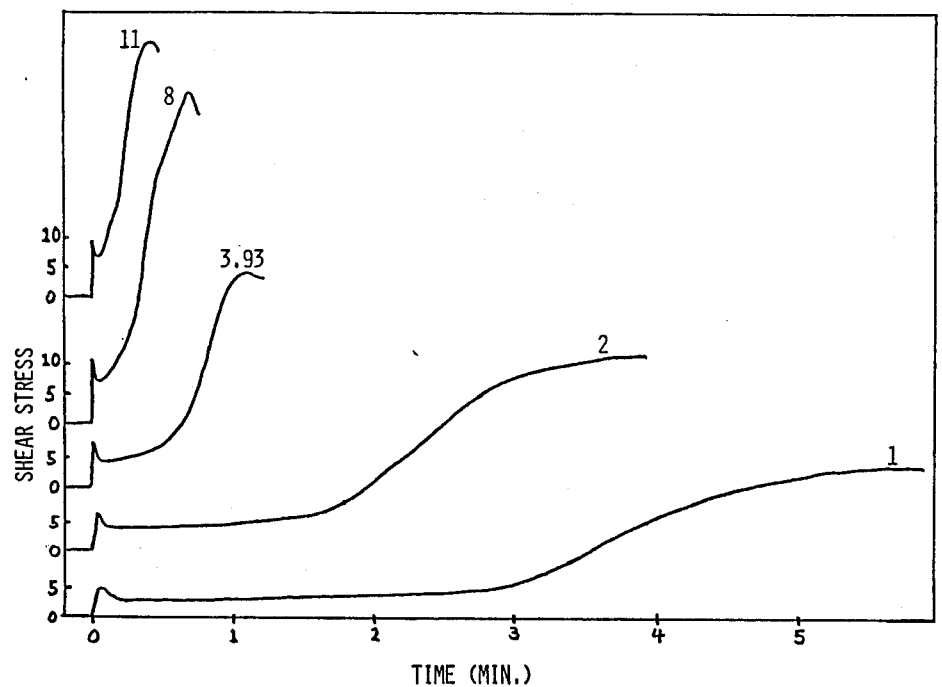
Figure 17:
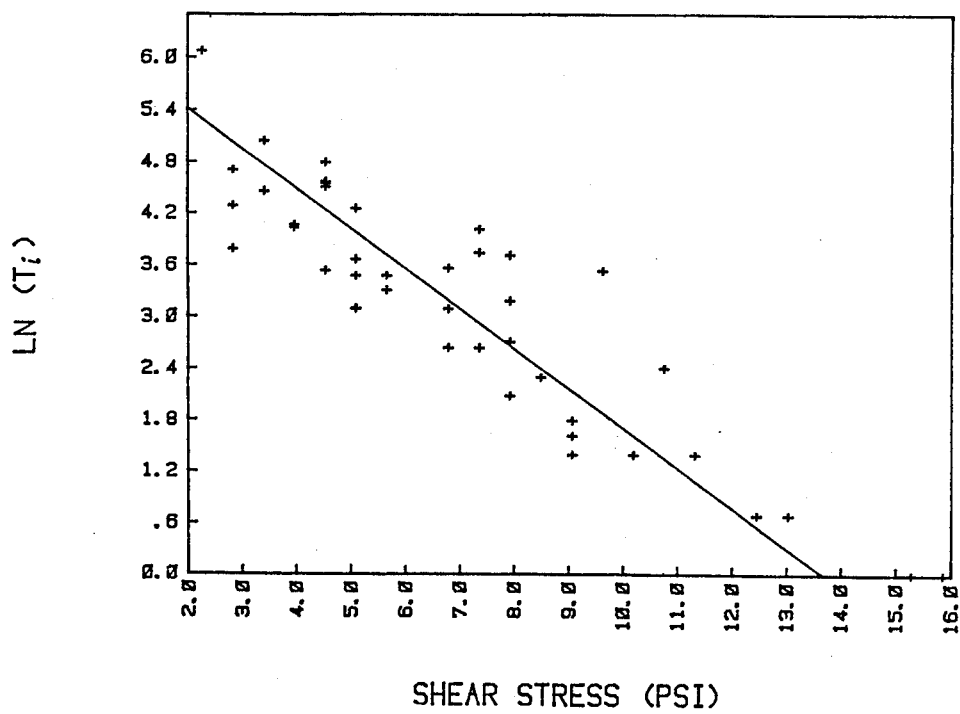

The levels of shear stress recorded during the manufacture of the tubular samples are reproduced in FIGS. 15A and 15B for the different blend compositions sheared at 122° C., and in FIG. 16 for the 90/10 blend sheared at different rates. The initial shear stress, too, is the product of the viscosity of the material, $\eta$, and the shear rate, $\dot{\gamma}$. Since the addition of polystyrene to the blend raises the viscosity, it also raises the shear stress during SIC. This is apparent in FIGS. 15A and 15B for shear stress levels during the induction period. Viscosity also increases with decreasing temperature and consequently raises the level of shear stress. Thus, the level of initial shear stress established during the induction period of the SIC process is a function of composition, temperature, and shear rate. It is obvious from FIGS. 15A, 15B and 16 that the induction time is related to the initial shear stress with longer times being associated with lower shear stress. If the logarithm of the induction time is plotted as a function of $t_o$ for all the samples, the points lie approximately along a straight line. Thus, we can approximate $t_i$ as $AeBt_o$ where A and B are constants. A least square analysis of the data plotted in FIG. 17 gives A = 569 sec. and B = 0.464 in$^2$/lb. While a reasonable fit is obtained, it is realized that this is only an empirical approximation. The effect of temperature on the stability of the crystalline phase with respect to the melt has not been included. Over the small temperature range used in this study, this effect is considered minimal but might become more apparent at temperatures beyond this range. The polybutene-1 phase may remain relatively continuous up to 40% polystyrene. This would explain why the 50/50 samples had induction times that were longer than the above least squares analysis predicted. Apparently at this level of polystyrene, the continuity of the polybutene-1 phase is disrupted.

Figures 18A, 18B:
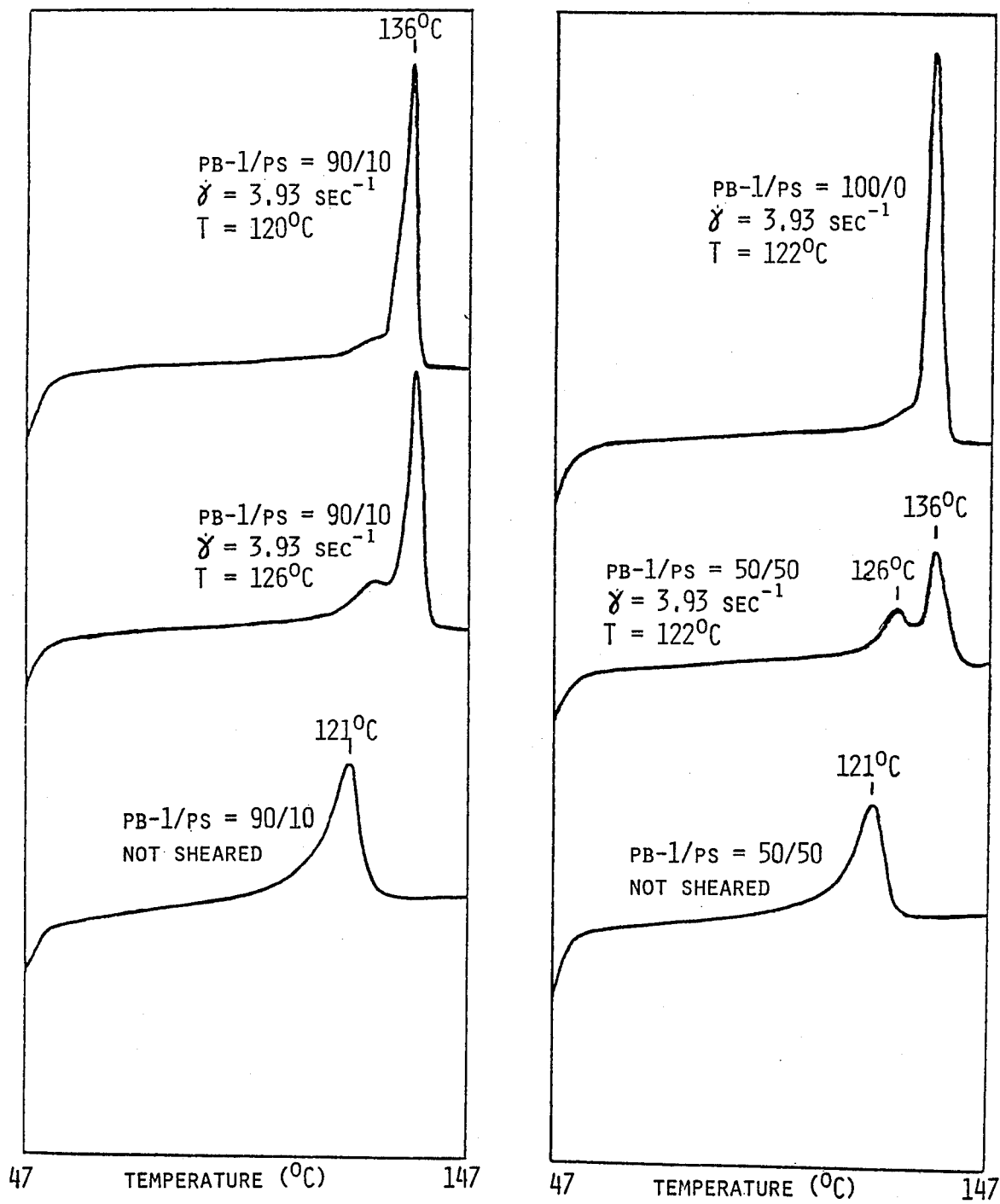
FIGS. 18(A) and (B) show melting temperature data for selected samples.
Figure 19:
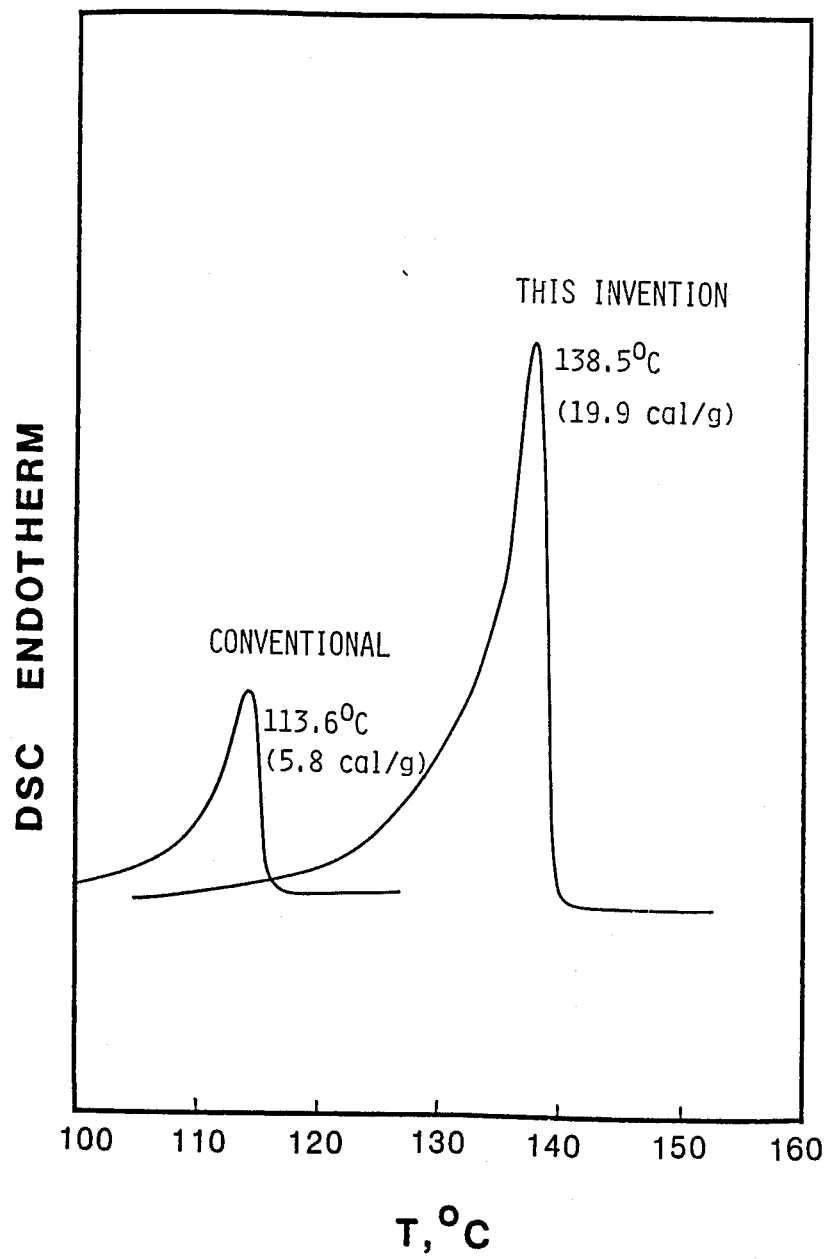
FIG. 19 are DSC endotherms showing melting points and indicating heats of fusion for sheared versus non-sheared polybutene-1 right after solidification.

The melting behavior of several varying polybutene-1/polystyrene blend samples is shown in FIGS. 18A and 18B. The nonsheared samples melt at ~121° C. while all the sheared samples melt at ~136° C. This 15° C. increase in melting temperature appears to be due to the difference in crystalline orientation of the two materials. FIG. 19 shows the melting points of and heats of fusion for pure polybutene-1 samples right after forming, one made conventionally and one made in accordance with the present invention. Hence the melting point increase is 25° C., 138° C. versus 113° C.

X-ray diffraction identifies the crystalline phase in both types of materials as modification I of polybutene-1 after aging, thus no new phase has been created. Heats of fusion are obtained from the melting endotherms and are listed in Table I. Percent crystallinity of polybutene-1 may be calculated from the heat of fusion as follows:

$$\% \text{ cryst.} = \frac{\Delta H}{x \cdot \Delta H_c}$$

where $\Delta H$ is the measured heat of fusion, x is the weight fraction of polybutene-1 in the blend, and $\Delta H_c$ is the heat of fusion for perfect 100% crystalline polybutene-1 in cal/g. Results are shown in Table I. The results indicate that SIC is responsible for a 35–40% increase in crystallinity of polybutene-1. This is partially responsible for the increased mechanical properties observed in SIC materials.

DSC studies of quiescent crystallization of these materials show that this process occurs at much lower temperatures than SIC. While crystallization could be effected in 1–5 minutes at 120°–126° C. using SIC, an hour is required for polybutene-1 to crystallize quiescently at 90° C. Even at 75° C., it takes five minutes for crystallization to finish without shear.

Further, the above cited crystallization times of one hour at 90° C. and five minutes at 75° C. for nonshear induced crystallized polybutene-1 are merely the times required to effect initial crystallization. They do not take into consideration the time required for secondary crystal transformation to the final stable crystal form. As noted above, this transformation normally takes up to about one week.

Figure 20:
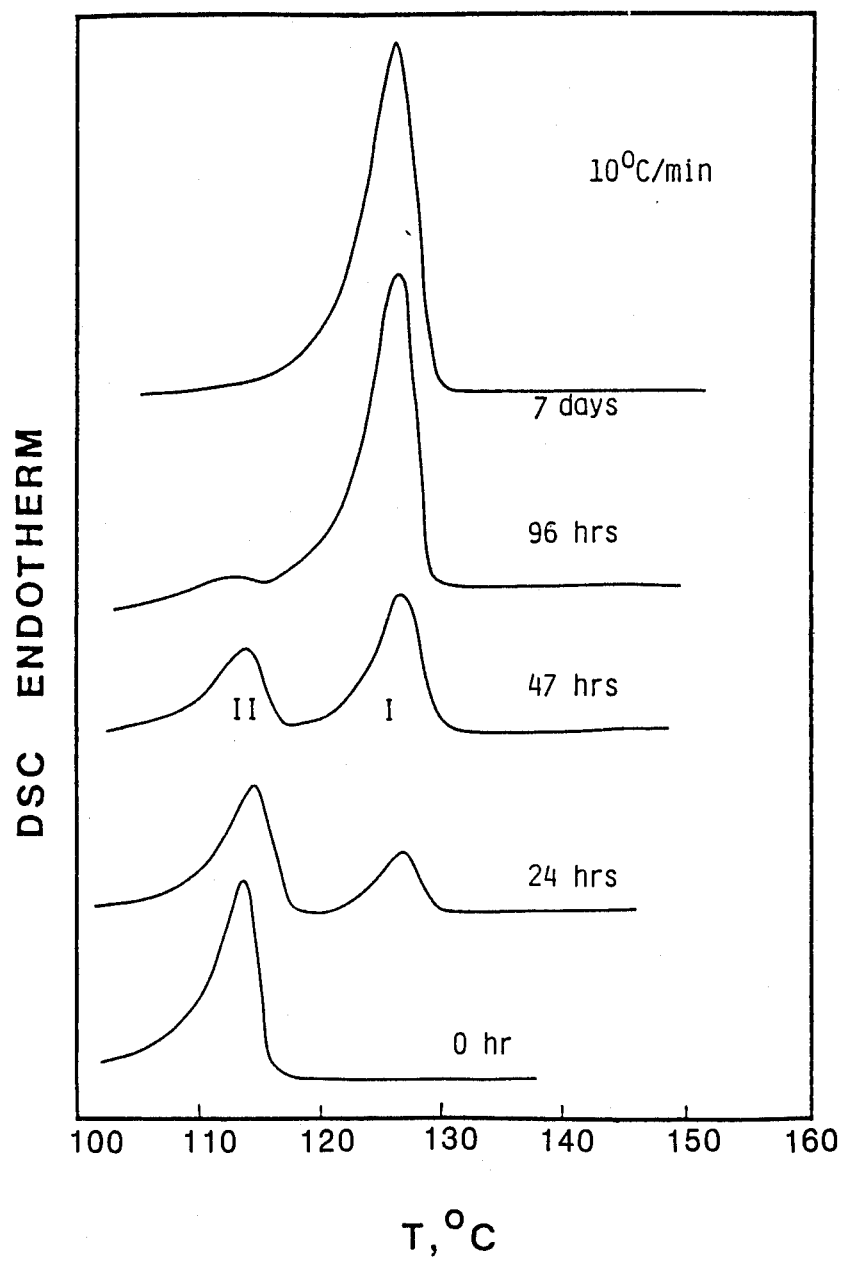
FIG. 20 are DSC endotherms showing melting points for non-sheared polybutene-1 after 0, 24, 47 and 96 hours and seven days of aging at room temperature.

The length of time required to effect crystal transformation is illustrated in FIG. 20, which shows melting points for conventionally molded polybutene-1 after different aging times. Aging was conducted at room temperature. The initial melting point of the conventionally molded polybutene-1 is about 113° C. After 24 hours, one sees two peaks, one at 113° C. and one at 128° C. indicating the beginning of crystal transformation. At 47 hours, the first peak is smaller and the second peak is larger. At 96 hours this trend has continued and at seven days, the peak at about 128° C. is the sole peak on the endotherm.

In contrast by using the process of the present invention, the foregoing transformation takes place extremely rapidly. The transformation is essentially completed as part of the shear crystallization process. This desired result is achieved in addition to the substantial increases in strength discussed above. Further, an even higher melting point of about 138° C. suggests that a superior, more stable crystal form is achieved.

Figure 21:
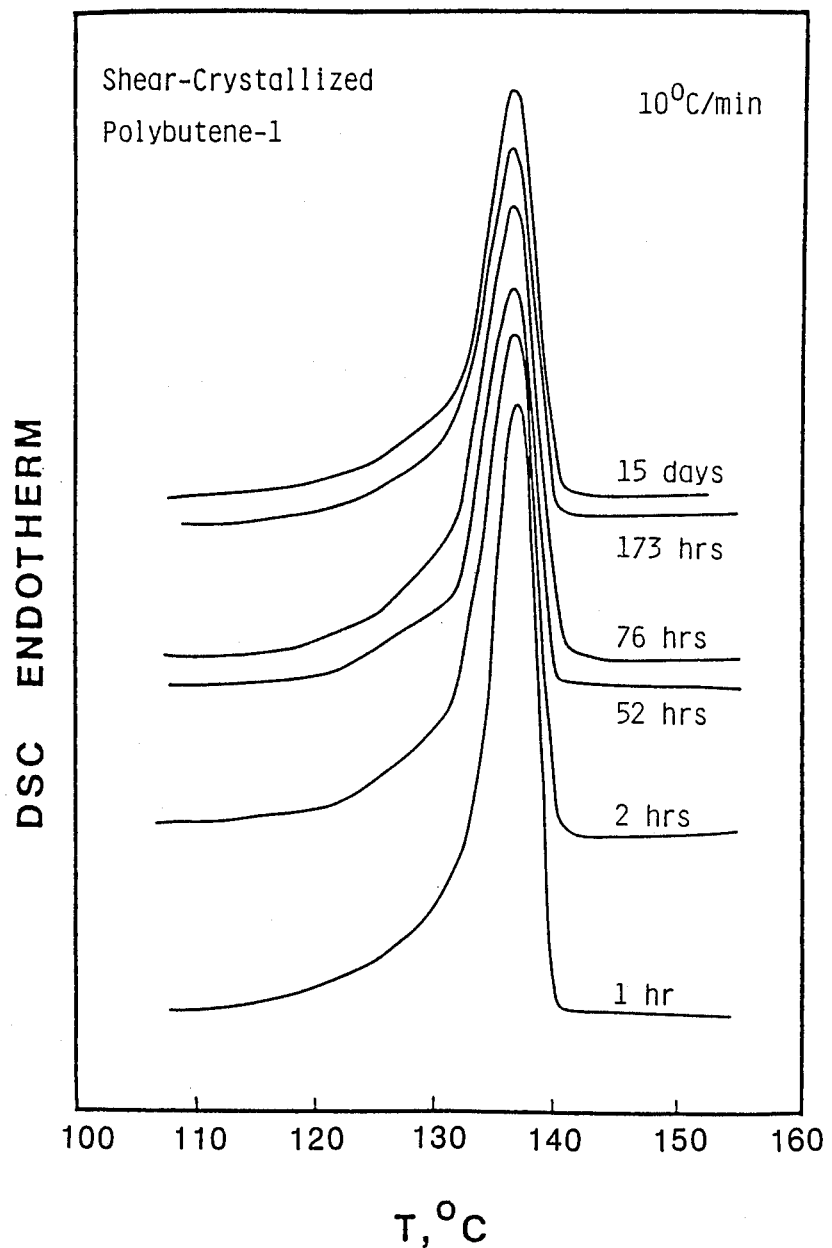
FIG. 21 are DSC endotherms showing melting points for shear-crystallized polybutene-1 in accordance with the present invention after 1, 2, 52, 76 and 173 hours and 15 days of aging.

This instantaneous crystallization yielding a melting point of about 138° C. is shown in FIG. 21 which shows melting points for shear crystallized polybutene-1 at different times after forming. The melting point is the same at 15 days as it is at one hour.

Figure 22A:
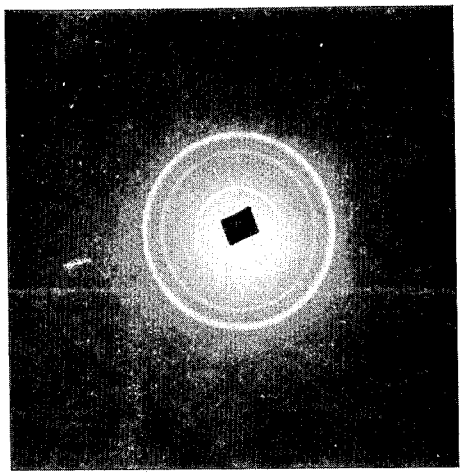
FIG. 22(A), (B) shows Statton Camera X-ray photographs for a (A) not sheared and (B) sheared polybutene-1.
Figure 22B:
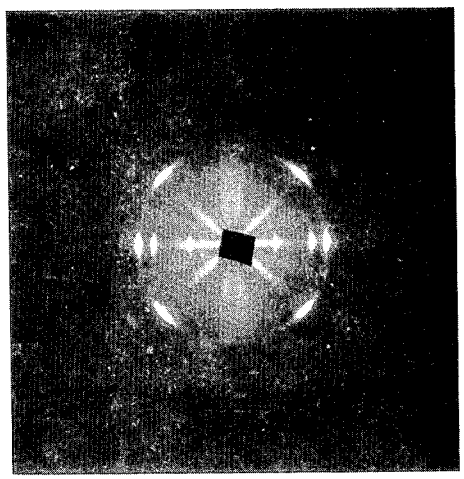

Wide angle X-ray diffraction also provided evidence of crystal orientation along the direction of applied shear stress. The diffraction pattern in FIG. 22A shows a uniform circular pattern indicating a random orientation of crystallites for the nonsheared sample. The pattern in FIG. 22B shows preferential scattering of X-rays in specific directions indicatng preferred orientation among the crystallites of the sheared sample. This is consistent with the idea that the degree of orientation plays a major role in the increase of mechanical properties through SIC since the latter pattern (FIG. 22B) belongs to a sample having better mechanical properties.

TABLE I

| | Results from DSC Melting Curves | | | | |
|---|---|---|---|---|---|
| Composition PB-1/PS (/K) | Shear Temp. (°C.) | Shear Rate (sec.) | Melting Temp.* (°C.) | ΔH fus (cal/gPB) | % Crystallinity |
| 90/10 | 120 | 3.93 | 134.8 | 21.5 | 72 |
| 90/10 | 122 | 3.93 | 135.6 | 20.0 | 67 |
| 90/10 | 124 | 3.93 | 134.0 | 21.2 | 71 |
| 90/10 | 126 | 3.93 | 136.6 | 20.4 | 68 |
| 90/10 | — | 0 | 119.9 | 14.4 | 48 |
| 90/10 | 120 | 1.0 | 134.0 | 19.8 | 66 |
| 90/10 | 120 | 2.0 | 135.2 | 21.0 | 71 |
| 90/10 | 120 | 8.0 | 133.8 | 20.4 | 68 |
| 90/10 | 120 | 11.0 | 133.8 | 20.8 | 70 |
| 70/30 | 122 | 3.93 | 134.7 | 21.4 | 72 |
| 70/30 | — | 0 | 121.0 | 15.6 | 52 |
| 70/30/6 | 122 | 3.93 | 136.7 | 20.9 | 70 |
| 70/30/6 | — | 0 | 121.0 | 15.6 | 52 |
| 50/50 | 122 | 3.93 | 134.0 | 22.3 | 75 |
| 50/50 | — | 0 | 121.0 | 16.1 | 54 |
| 100/0 | 122 | 3.93 | 133.8 | 21.4 | 72 |
| 100/0 | — | 0 | 121.7 | 16.0 | 54 |

*Temperature corresponding to maximum in DSC endotherm.

ALTERNATIVE EQUIPMENT FOR MAKING ALTERNATIVE PRODUCT IN ACCORDANCE WITH THE PRESENT INVENTION

Many different polybutene-1 products can be made in accordance with the present invention. Extrusion apparatus disclosed in FIG. 23 can be used to manufacture ultra high modulus pipe in accordance with the present invention. The polybutene-1 polymer is melted and fed by screw 210 into the main extrusion chamber 220. Located within cylindrical chamber 220 is a rotatably mounted mandrel 230 driven by motor 240 having an output drive gear 241 which engages a drive gear 231 on the end of rotating mandrel 230. Rotatably mounted on the end of main extrusion chamber 220 is an outer shell 250 which includes an annular gear track on its exterior surface. Gear track 251 is engaged by drive gear 261 driven by motor 260. Outer shell 250 is rotated in a direction opposite to the direction of rotation of inner mandrel 230.

Figure 23:
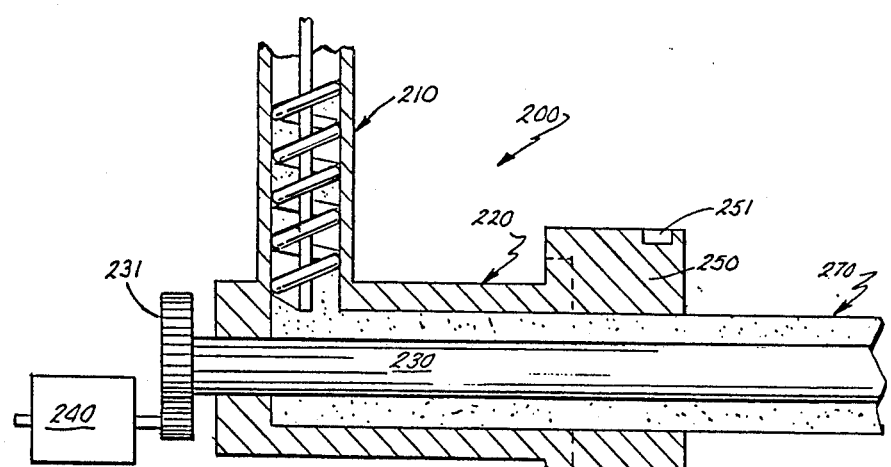
FIGS. 23–25: Alternative Embodiment Apparatus

The temperature of the polymer is highest as it enters the main extrusion chamber 220 at the left in FIG. 23. The temperature of the polymer is controlled such that it begins to cool as it proceeds towards the exit and by the time it reaches outer shell 250, it is at the desired crystallization temperature, i.e., within a range from just above to just below the nominal melting point of the polybutene-1 polymer. The pipe 270 which then exits the extruder 200 is a crystalline fiber reinforced polybutene-1 pipe having exceptional strength characteristics.

Figure 24:
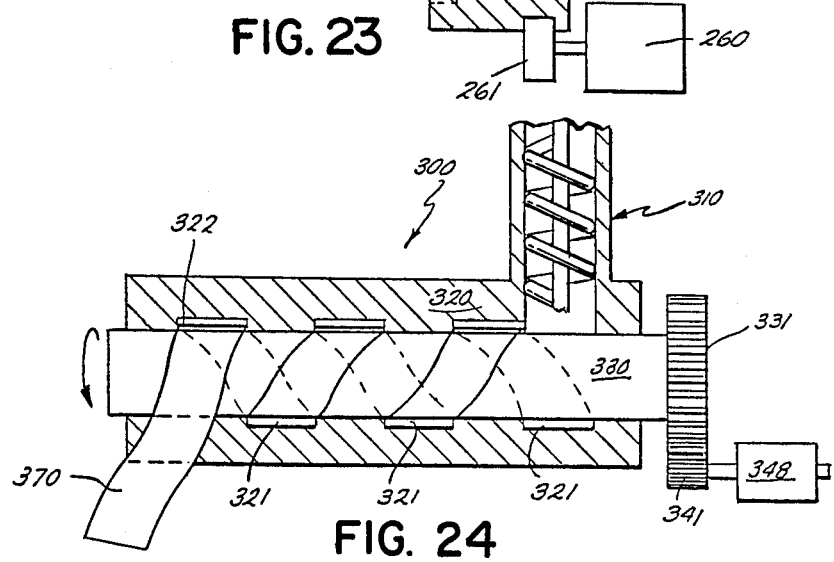

Extruder 300 (FIG. 24) is designed to produce thin sheet in accordance with the present invention. Like extruder 200, the polymer is melted and fed by screw 310 into a main extrusion chamber 320 which is closed at both ends. An inner mandrel 330 is rotatably mounted within extrusion chamber 320 and is driven at gear 331 by a motor 348 through motor drive gear 341. Mandrel 330 fits snugly against the inside walls of main extrusion chamber 320 except for a spiral track 321 which is cut into the interior wall of extrusion chamber 320 and which extends from the screw end of chamber 320 to the opposite end where it exits to the exterior of the apparatus at exit port 322.

The polymer is forced into main extrusion chamber 320 and begins to cool down as it proceeds along spiral path 321. Towards the left side of extrusion chamber 320 as viewed in FIG. 24, the polymer temperature reaches the desired crystallization temperature and the shearing action created by mandrel 330 rotating within the main extrusion chamber 320 effects shear induced crystallization in the polymer. The polymer 370 then exits through exit port 322 as a thin sheet of polymer self reinforced by very fine crystalline polymer fibers.

Figure 25:
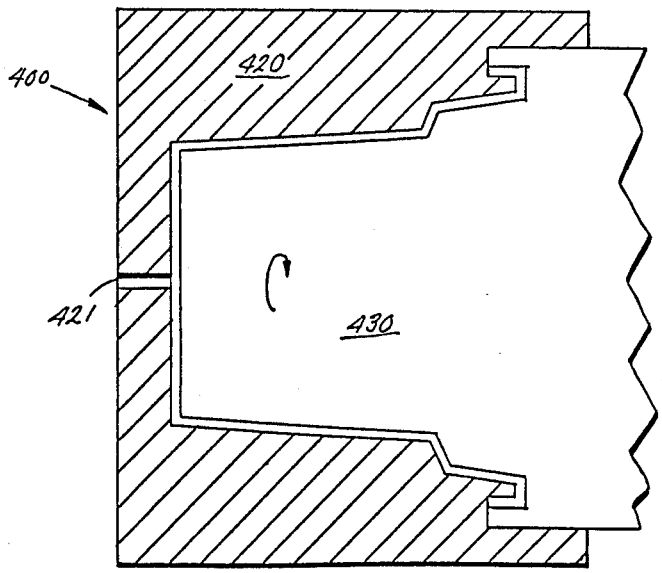

Apparatus 400 (FIG. 25) illustrates in a general way the manner in which a cup-shaped object can be made in accordance with the present invention. The mold 400 includes an exterior shell 420 defining in a cylindrical manner the exterior shape of a cup or like object to be molded. Rotatably mounted in outer shell 420 is a rotating mandrel 430 whose exterior configuration conforms to but is spaced slightly from the interior configuration of outer shell 420. The melted polybutene-1polymer is injected through sprue 421 into the space between mandrel 430 and outer shell 420. When the desired crystallization temperature is reached, mandrel 430 is rotated until shear induced crystallization is effected. Mandrel 430 would then be withdrawn from outer shell 420 and the cup-shaped product made in accordance with the present invention would then be removed. While the shear at the flat bottom of the cup is not generally constatnt as is most preferred, it is at least generally uniform.

CONCLUSION

The present invention affords a revolutionary method for producing polybutene-1polymer products. Of course, it is understood that the above are merely preferred embodiments of the invention and that various changes and alterations can be made without departing from the spirit and broader aspects thereof.

The embodiments of the invention in which an exclusive property or privilege is claimed are defined as follows:

1. A method for producing a polybutene-1 polymer product comprising:
    forming a melt of polymeric material comprising polybutene-1 at a temperature above the melting point of polybutene-1;
    introducing said melt of polymeric material comprising polybutene-1 into a form defining the desired shape;
    cooling said melt of polymeric material comprising polybutene-1 to a temperature in the range from just above the melting point to just below the melting point of said polybutene-1 polymer;
    subjecting said melt of polymeric material to a generally uniform and constant rotational shear in said form within said temperatrure range from just above to just below the melting point of said polybutene-1 polymer to induce crystallization thereof;
    discontinuing rotational shear while said melt of polymeric material is at a temperature within said range of temperature; and
    allowing said polymeric material to harden.

2. The method of claim 1 in which said shear of said polybutene-1 polymer is discontinued when its viscosity reaches its maximum value.

3. The method of claim 2 in which said shearing is conducted at a shear rate of less than 11 sec.$^{-1}$.

4. The method of claim 3 in which said shearing step is conducted at a shear rate of about 4 sec.$^{-1}$.

5. The method of claim 4 in which said shearing is conducted when said polymer is at a temperature of between 120° and 126° C.

6. The method of claim 5 in which said shearing is conducted when said polymer is at a temperature of about 122° C.

7. The method of claim 1 in which said form comprises a cylindrical mandrel rotatably mounted within a shell; said shear being created by rotating said cylindrical mandrel and shell relative to one another.

8. The method of claim 7 in which the inner surface of said shell abuts the exterior surface of said mandrel except in the space defined by a spiral track in said inner wall of said shell, extending generally from one end of said shell to the other; and
    said method including forcing said polymer through said spiral track as said mandrel and said shell are rotated relative to one another.

9. The method of claim 8 in which said shearing is conducted at a shear rate of less, than 11 sec.$^{-1}$.

10. The method of claim 9 in which said shearing step is conducted at a shear rate of about 4 sec.$^{-1}$.

11. The method of claim 10 in which said shear of said polymer is discontinued when its viscosity reaches its maximum value.

12. The method of claim 1 in which said shearing is conducted at a shear rate of less than 11 sec.$^{-1}$.

13. The method of claim 12 in which said shearing step is conducted at a shear rate of about 4 sec.$^{-1}$.

14. The method of claim 14 in which up to 50% polystyrene is blended with said polybutene-1.

15. The method of claim 14 in which 10% polystyrene is blended with said polybutene-1.

16. The method of claim 15 in which said shearing is conducted when said polymer is at a temperature of between 120° and 126° C.

17. The method of claim 16 in which said shearing is conducted when said polymer is at a temperature of about 122° C.

* * * * *

UNITED STATES PATENT AND TRADEMARK OFFICE
CERTIFICATE OF CORRECTION

PATENT NO. : 4,783,301
DATED : November 8, 1988
INVENTOR(S) : Kuo Z. Hong

It is certified that error appears in the above-identified patent and that said Letters Patent is hereby corrected as shown below:

Col. 2, line 18, "(10B):" should read --(10B)--.

Col. 2, line 19, "shows" should read --show--.

Col. 2, line 23, "shows" should read --show--.

Col. 4, line 68, "itelf" should read --itself--.

Col. 8, line 62, following the word "obtain" insert therefor --average--.

Col. 12, line 12, "indicatng" should read --indicating--.

Col. 12, line 47, following the word "apparatus" insert therefor --200--.

UNITED STATES PATENT AND TRADEMARK OFFICE
CERTIFICATE OF CORRECTION

PATENT NO. : 4,783,301
DATED : November 8, 1988
INVENTOR(S) : Kuo Z. Hong

It is certified that error appears in the above-identified patent and that said Letters Patent is hereby corrected as shown below:

Col. 12, line 55, following the word "track" insert therefor --251--.

Col. 13, line 36, "polybutene-1polymer" should read --polybutene-1 polymer--.

Col. 13, line 46, "statnt" should read --stant--.

Col. 13, line 51, "polybutene-1polymer" should read --polybutene-1 polymer--.

Col. 14, line 10, "temperatrure" should read --temperature--.

Col. 14, line 44, following the word "less" delete ",".

Col. 14, line 54, "claim 14" should read --claim 12--.

Signed and Sealed this

Eighteenth Day of July, 1989

Attest:

DONALD J. QUIGG

Attesting Officer

Commissioner of Patents and Trademarks